United States Patent [19]
Gentile
[11] Patent Number: 4,914,798
[45] Date of Patent: Apr. 10, 1990

[54] METHOD FOR REMOVING GEAR TRAIN ASSEMBLY OR FINAL DRIVE ASSEMBLY FROM A POWER TRANSMISSION CASING

[76] Inventor: Charles I. Gentile, 7342 Woodthrush, Dallas, Tex. 75230-4238

[21] Appl. No.: 360,542

[22] Filed: Jun. 2, 1989

Related U.S. Application Data

[62] Division of Ser. No. 209,847, Jun. 22, 1988, abandoned.

[51] Int. Cl.[4] .......... B23P 19/00

[52] U.S. Cl. .......... 29/426.5; 29/280; 29/283; 269/48.1; 294/93

[58] Field of Search .......... 29/426.5, 282, 283, 29/281.4, 281.5, 280, 271, 274; 254/29 R, 133 R, 134.3 PT; 269/50, 52, 48.1; 294/93, 94, 55.5, 158; 414/113, 114

[56] References Cited

U.S. PATENT DOCUMENTS

| | | | |
|---|---|---|---|
| 914,743 | 3/1909 | McDonald | 29/266 X |
| 3,052,973 | 9/1962 | Williams | 29/426.5 X |
| 3,055,093 | 9/1962 | Ruble | 29/282 X |
| 3,228,678 | 1/1966 | Koger | 269/48.1 |
| 3,882,785 | 5/1975 | Rowe | 294/55.5 X |
| 4,295,260 | 10/1981 | Divers | 29/426.5 |
| 4,564,994 | 1/1986 | Marx | 29/281.4 X |
| 4,807,346 | 2/1989 | Wisner | 29/283 X |

OTHER PUBLICATIONS

Atra Transmissions Instructions 1984, pp. 32 thru 37, Turbo Hydra-Matic.

*Primary Examiner*—Charlie T. Moon
*Attorney, Agent, or Firm*—Richards, Medlock & Andrews

[57] ABSTRACT

A power transmission gear assembly puller for use on the General Motors 440 power transmission, facilitating the accessibility of power transmision gears for repair and maintenance. A novel means for removing a gear assembly incorporating a shaft with an expandable seat on one end on which the gear assembly rests when expanded. A unique means for expanding the seat while inside the gear assembly through the shaft from the handle. The gear assembly puller reduces transmission repair time significantly while providing ease of gear assembly removal, as well as safety with regard to the technician's hands.

3 Claims, 2 Drawing Sheets

14
13
30
12
11
18
29
10
17
16
9
24
15
8
7
6
25
1
5
4
2
3

23
22
9
7
6
4
3
2

METHOD FOR REMOVING GEAR TRAIN ASSEMBLY OR FINAL DRIVE ASSEMBLY FROM A POWER TRANSMISSION CASING

This is a division of application Ser. No. 209,847 filed June 22, 1988 now abandoned.

FIELD OF INVENTION

This invention relates to the art of tools for facilitating the accessibility of power transmission gears for repair and maintenance.

BACKGROUND OF THE INVENTION

Previous gear pullers relate to removing gears from a drive shaft, gear by gear, once the transmission housing is removed. However, recent transmissions allow for the removal of the drive shaft and gears without breaking down the transmission housing. Removal of a transmission gear in this fashion is performed by hand, in cramped spaces, piecemeal. This situation is time consuming and hazardous.

SUMMARY OF INVENTION

In accordance with one aspect of the present invention, a transmission gear puller assembly is provided which provides a handle, a shaft, and an elastic seat. The shaft is tubular with a threaded rod running through its cavity. The threaded rod has a handle perpendicular to its linear axis and a nut threaded along its length. The nut is seated against the tube along the threaded rod at the handle end. The elastic seat is positioned along the threaded shaft opposite the handle end. The elastic seat is laterally expandable and is fastened to the threaded shaft and seated against the tube. A gear assembly stack gauge is located at a predetermined position on the tube and extends radially from the shaft. A centering gauge also extends radially from the shaft and is located along the tube.

Once a drive shaft of a transmission has been removed, the transmission gear puller assembly is inserted in the drive shaft's place up to the gear stack gauge. While keeping the handle stationary and rotating the draw nut, the threaded shaft is drawn through the hollow tube, squeezing the elastic seat, thus expanding the elastic seat radially, providing a seat for the gear assembly to rest on. At this point the gear assembly may be pulled in its entirety.

DETAILED DESCRIPTION

Figure 2:
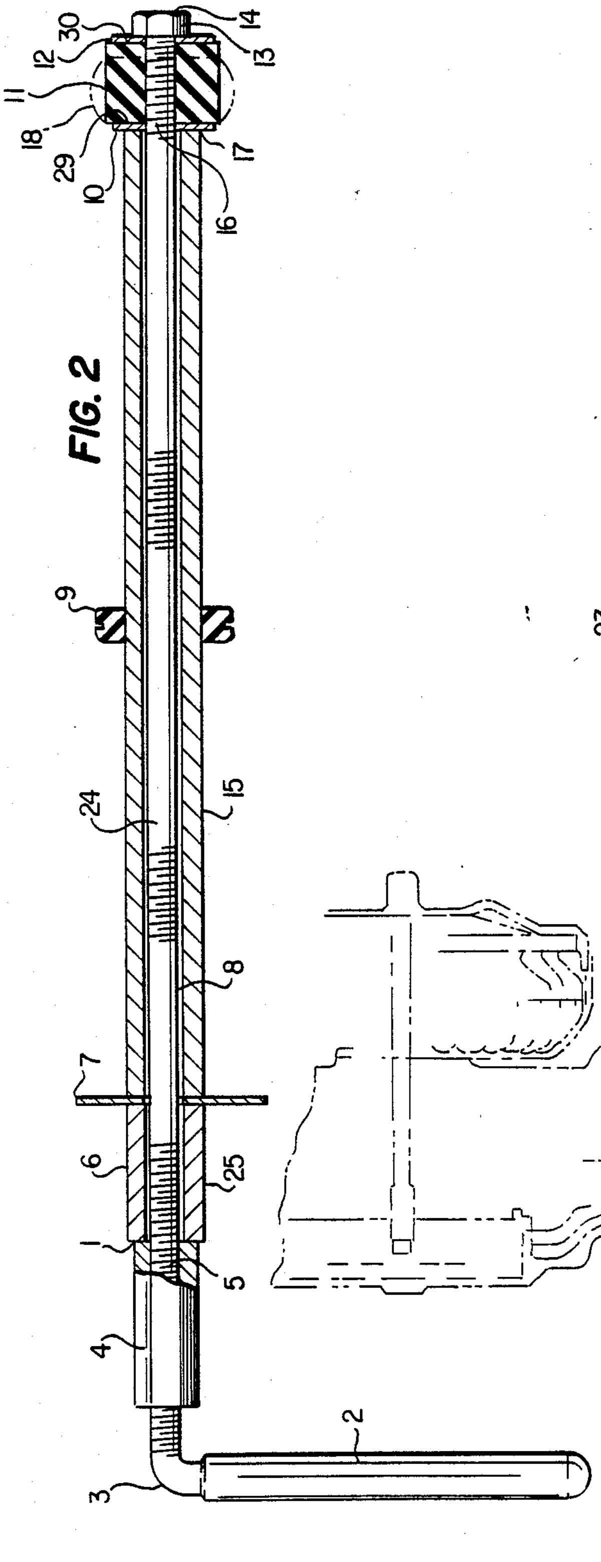
FIG. 2 is a side sectional view of the gear puller assembly taken along its linear axis.
Figure 1:
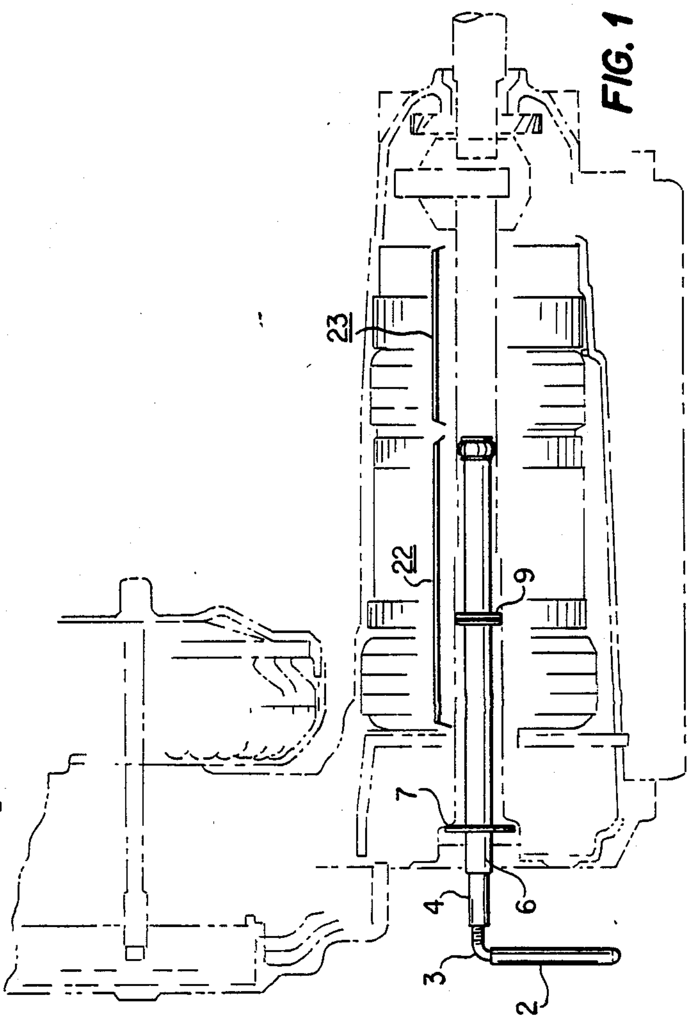
FIG. 1 is a side elevational view of the gear puller assembly positioned in place of the transmission drive shaft.

The embodiment is a power transmission gear puller assembly for a 440 General Motors front wheel drive power transmission as shown in FIG. 1. The gear puller having a tubular shaft assembly 6 being bisected into two pieces 25 having a length of 13⅛ inches and 15 having a length of 1½ inches, with a diameter of ¾ inches. A rod assembly 3 with a main length 24 of approximately 20 inches and a diameter of 5/16 inches. One end of the rod assembly bent perpendicular to the main length 24 of the rod assembly forming a handle 2 approximately four inches in length. The rod assembly 3 is threaded along the main length, if not, then having threaded portions 5 and 16. The tubular shaft assembly 6 having a steel washer 10 located at its end 17, with an outer diameter of ⅞ inches and an inner diameter of ⅜ inches and a thickness of 1/16 inches having a surface 29. The rod assembly 3 having a similar washer 12 located at its end 14 having a surface 30. The main length 24 of the rod assembly 3 extending through the tubular shaft assembly cavity 8, and through the inner diameter of the steel washers 10 and 12. An internally threaded member 4, 1¾ inches in length, having an outer diameter of ½ inch and an inner diameter of 5/16 inches is located on the rod assembly 3 in proximity to the handle as on threaded portion 5. An elastic sleeve 11 of hard rubber, ¾ inches in length with an outer diameter of one inch and an inner diameter of ¾ inches. The elastic sleeve 11 being located and the rod assembly 3 between the tubular shaft surface 29 and the rod assembly surface 30. The elastic sleeve 11, washer 12, and washer 10 being captured on the rod assembly 3 by a nut 13 screwed on the rod assembly end 14.

On the transmission gear puller assembly along its linear axis is a steel washer 7 having an outer diameter of 1⅜ inches and an inner diameter of ⅜ inches. The steel washer 7 located between the tubular shaft pieces 15 and 25, 13⅜ inches from the tubular shaft assembly surface 29 on the rod assembly 3. The steel washer 7 acting as a depth gauge to indicate proper insertion of the gear puller assembly into the 440 transmission, as well as indicating proper assembly of the gear train assembly 22 and final drive assembly 23 before repositioning in the transmission. Also located on the gear puller assembly at approximately half way up the tubular shaft assembly 6 is an annular member 9 of hard rubber, having an outer diameter of 1¼ inches and an inner diameter of .⅜ inches. The annular member 9 maintaining an interference fit with the tubular shaft assembly piece 15, acting as a centering gauge whereby the gear puller assembly may be centered.

Partial removal of assembly 22 can be obtained upon insertion of the gear puller assembly into assembly 22, the stripe 27 located on the tubular shaft assembly 6 indicates the roper insertion depth of the gear puller assembly.

Figure 3:
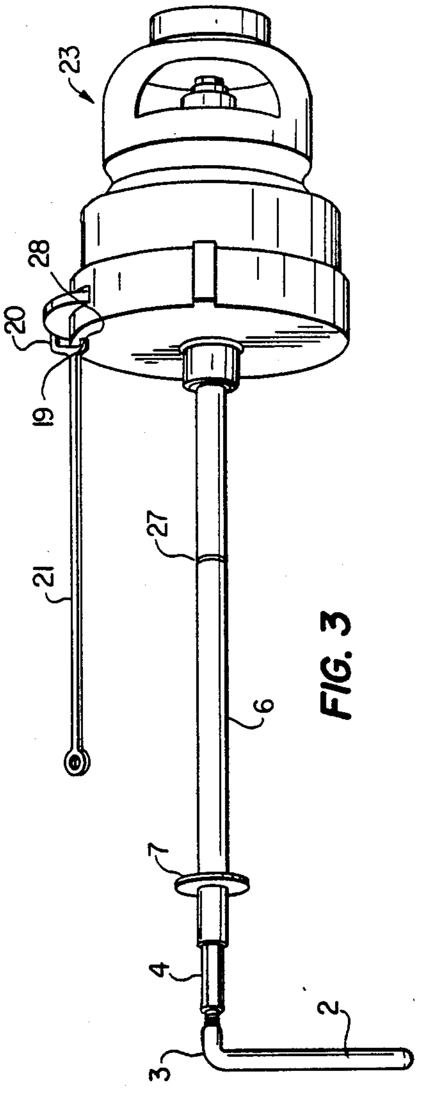
FIG. 3 is a side elevational view of the parking pawl cradle and gear puller used in conjunction with the final drive assembly.
Figure 4:
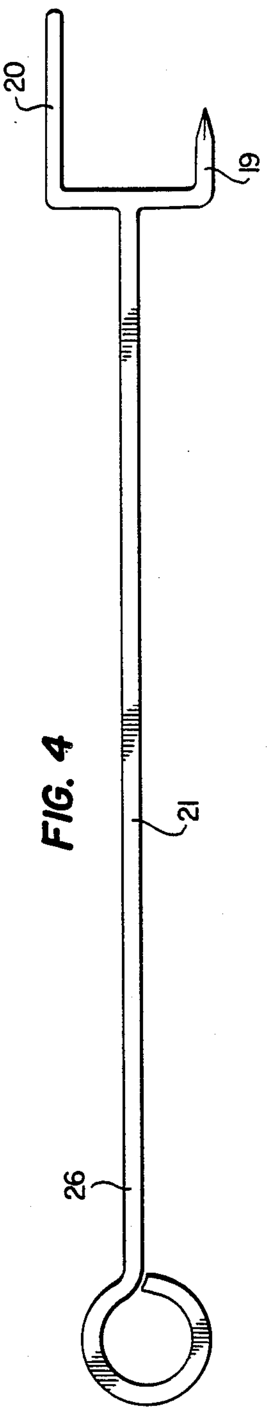
FIG. 4 is a side elevational view of the parking pawl cradle.

Once assembly 22 is removed from the transmission casing, the gear puller assembly incorporates a parking pawl cradle 21 for removal of the assembly 23 as shown in FIG. 4. The parking pawl cradle 21 is a fork having a first prong 19 and second prong 20 and a handle 26, having a total length of about one foot. The first prong 19 has a conical tip and a predetermined length to allow insertion into the hole 28 on assembly 23 adjacent to the parking pawl, as shown in FIG. 3. The second prong 20 of the parking pawl cradle 21 is positioned at a predetermined distance from the first prong 19 so that the parking pawl position may be maintained upon removal of assembly 23 from the transmission casing, as shown in FIG. 3.

The embodiment of the gear puller assembly described is specifically dimensioned for application of the gear puller assembly to the General Motors 440 front wheel drive power transmission. The dimensions of the gear puller assembly are only determinative of the particular transmission requiring maintenance. A gear puller assembly of different dimension can be employed for a different transmission; employing the same principles embodied in the present gear puller assembly configuration.

In order to use the gear puller assembly as embodied first remove the valve body, channel plate, output shaft and driven sprocket from the transmission. Finger tighten the threaded member 4 on the rod assembly 3. Insert the gear puller assembly into the input housing drum of assembly 22 until it stops at the depth gauge 7. Tighten the threaded member 4 against the tube end 1, drawing the rod assembly through the tubular shaft assembly cavity 8, squeezing the elastic sleeve 11 so as to expand it radially providing surface 18 on which assembly 22 rests to allow removal from the transmission housing in its entirety as shown in FIG. 1. Hold down the second clutch drum while applying tension to the gear puller handle 2, determining whether the threaded member 4 has been tightened enough to lift assembly 22 safely. Lift gear puller assembly and assembly 22 including the input drum, second clutch drum, third roller clutch, input sprag, input sun gear, reverse reaction drum, input carrier assembly, reaction carrier assembly and final drive sun gear shaft up and out of the transmission casing.

Once the assembly 22 has been removed, the final drive 23 may be removed in a similar procedure. First remove the reverse band, the No. 1 and No. 2 band, the reaction sun gear drum assembly, and the internal gear/case snap ring, making sure that the lube oil pipe to the internal gear has been removed. Place shift selector in park position. Insert prong 19 of parking pawl cradle 21 into the hole adjacent to the parking pawl 28 as shown in FIG. 3. The prong 20 of the parking pawl cradle 21 will cradle the parking pawl extending from the final drive 23 as shown in FIG. 3. Once the gear puller has been removed from assembly 22, finger tighten the threaded member 4 on the gear puller. Insert the gear puller in the final drive splines, making sure that the gear puller bottoms out. Tighten the threaded member 4 against the tube end 1. Before lifting the final drive assembly 23, test to make sure that the gear puller has been seated and tightened correctly by holding down the internal gear and applying tension to the gear puller. Once the gear puller is secure, lift assembly 23 out of the transmission casing. Release the threaded member 4 and lift gear puller from assembly 23.

Should partial removal of assembly 22 be desired, first remove the second clutch drum, input clutch housing drum with a third roller clutch, and input sprag from transmission. Finger tighten threaded member 4 on gear puller. Insert the gear puller into the input clutch housing only as far as the indicator line 27 on the tubular shaft 15. Tighten threaded member 4 against tubular shaft end 1. Lift upper assembly out of place. Release threaded member 4 and lift gear puller from drum assembly.

To install assembly 23, place assembly 23 in an upright position. Finger tighten the threaded member 4 on the gear puller. Insert the gear puller fully and tighten the threaded member 4 against tubular shaft end 1. Insert the parking pawl cradle 21. Lower assembly into transmission case. After all gears are properly seated, remove gear puller and parking pawl cradle 21. Install snap ring. To install assembly 22, place assembly 22 in an upright position. Finger tighten the threaded member 4 on the gear puller. Insert the gear puller through the clutch housing. Tighten the threaded member 4 against the tubular shaft end 1. Lift assembly 22 and insert into transmission case. Release threaded member 4 and lift gear assembly 22 from drum assembly.

To ensure that all clutches are seated properly, assemble entire gear assembly 22 in upside down position. When fully assembled, turn over into upright position. Finger tighten threaded member 4 on gear puller and insert gear puller into assembly 22. If all components are properly stacked and engaged, the gear puller should be bottomed out. To test, back threaded member 4 off threaded portion of shaft 5 a few times. If gear puller drops, even slightly, all components are not properly stacked. However, should the depth gauge wobble when touched, with threaded member loose on gear puller and gear puller fully bottomed out, a missing component is indicated.

When gear assembly 22 is properly stacked and engaged, tighten threaded member 4 on gear puller against tubular shaft end 1. Lift assembly into transmission case using a scribe to hold reverse band level. When assembly 22 is fully seated release threaded member 4 and remove gear puller.

The embodiment of the gear puller assembly shown provides several advantages for the technician working on the 440 transmission. The gear puller assembly allows for the removal of the entire gear train assembly and final drive assembly in their entirety. Previously, removal of these assemblies was accomplished by hand piece by piece in a limited working space. This was a time consuming process. The present invention allows the technician to remove the assemblies without dismantling them. By use of the gear puller assembly embodiment as described, the technician can reduce the time it takes to access the gears of the 440 transmission by more than half. Additionally, the gear puller assembly facilitates removal so that removal of the 440 transmission gear is accomplished without inserting one's hands into the gear assemblies thereby reducing risk to the technician's hands.

I claim:

1. A method for removing the gear train assembly or final drive assembly from a power transmission casing, comprising the steps of:

providing a gear puller comprising a tube having a threaded rod therein with an expandable member located on a first end of the rod beyond a first end of said tube and a nut threaded on the other end of said rod adjacent the other end of said tube, said other end of said rod also having a handle thereon outwardly of said nut, inserting said tube and expandable member into said assembly up to a depth gauge positioned on said tube, holding said nut while rotating said handle or holding said handle while rotating said nut to cause said tube to expand the expandable member radially, providing a seat on which an assembly rests, and then pulling said handle to remove said assembly from the transmission casing.

2. The method for removing gear train or final drive assemblies of claim 1, further comprising the steps of:

inserting a fork having a first and second prong, into the final drive assembly while the gear shift is in park position, placing the first prong into the aperture in the final drive adjacent to the parking pawl, and placing the second prong against the parking pawl located on the final drive allowing removal of the final drive once the gear shift is out of park position without loss of final drive assembly integrity.

3. The method for removing gear train or final drive assemblies of claim 1, further comprising the steps of: inspecting the stack up of the gear train and final drive assemblies in relation to a depth gauge located on the tube before repositioning the assemblies into the transmission casing.

* * * * *